(12) United States Patent
Eshiro et al.

(10) Patent No.: US 12,719,983 B2
(45) Date of Patent: Aug. 25, 2026

(54) EXCHANGE, AND TELEPHONE EXCHANGE METHOD

(71) Applicant: NEC Platforms, Ltd., Kawasaki (JP)

(72) Inventors: Hidetoshi Eshiro, Kanagawa (JP); Hiroyuki Ebihara, Kanagawa (JP); Tomohiro Ohno, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 333 days.

(21) Appl. No.: 18/287,591

(22) PCT Filed: Jan. 24, 2022

(86) PCT No.: PCT/JP2022/002467
§ 371 (c)(1),
(2) Date: Oct. 19, 2023

(87) PCT Pub. No.: WO2023/281780
PCT Pub. Date: Jan. 12, 2023

(65) Prior Publication Data

US 2024/0223703 A1 Jul. 4, 2024

(30) Foreign Application Priority Data

Jul. 8, 2021 (JP) ................................ 2021-113589

(51) Int. Cl.
*H04M 3/42* (2006.01)
*H04Q 3/00* (2006.01)

(52) U.S. Cl.
CPC ...... *H04M 3/42314* (2013.01); *H04Q 3/0025* (2013.01); *H04Q 2213/1322* (2013.01)

(58) Field of Classification Search
None
See application file for complete search history.

(56) References Cited

U.S. PATENT DOCUMENTS

2003/0072330 A1* 4/2003 Yang .................. H04L 65/1043 370/465
2004/0042469 A1* 3/2004 Clark ..................... H04L 45/36 370/401

(Continued)

FOREIGN PATENT DOCUMENTS

JP 2007-280094 A 10/2007
JP 2008-035476 A 2/2008

(Continued)

OTHER PUBLICATIONS

Extended European Search Report for EP Application No. 22837203.3, dated on Mar. 21, 2025.

(Continued)

*Primary Examiner* — Hemant S Patel
(74) *Attorney, Agent, or Firm* — Sughrue Mion, PLLC

(57) ABSTRACT

A first gateway registers an extension number of a terminal apparatus to an extension control means. A flow control means routes an outgoing call originated from the terminal apparatus and an outgoing call addressed to the terminal apparatus between the first gateway and a second gateway. When receiving the outgoing call originated from the terminal apparatus from the first gateway, the extension control means processes the outgoing call as an outgoing call from the extension number of the terminal apparatus. In addition, when an outgoing call addressed to the extension number of the terminal apparatus is made, the extension control means transmits the outgoing call addressed to the terminal apparatus to the first gateway.

22 Claims, 11 Drawing Sheets

(56) References Cited

U.S. PATENT DOCUMENTS

2005/0083948 A1 4/2005 Hiroshima et al.
2006/0182089 A1 8/2006 Azuma
2007/0206585 A1* 9/2007 Lee ....................... H04M 7/006 370/356
2011/0002326 A1* 1/2011 Hwang ............... H04M 7/0024 370/352

FOREIGN PATENT DOCUMENTS

JP 2014-003577 A 1/2014
JP 2014-187698 A 10/2014
JP 2015-228559 A 12/2015
JP 2017-118358 A 6/2017
JP 2019-016923 A 1/2019
JP 2019-115005 A 7/2019

OTHER PUBLICATIONS

Extended European Search Report for EP Application No. 22837203.3, dated on Apr. 30, 2025.
International Search Report for PCT Application No. PCT/JP2022/002467, mailed on Apr. 5, 2022.

* cited by examiner

EXCHANGE, AND TELEPHONE EXCHANGE METHOD

This application is a National Stage Entry of PCT/JP2022/002467 filed on Jan. 24, 2022, which claims priority from Japanese Patent Application 2021-113589 filed on Jul. 8, 2021, the contents of all of which are incorporated herein by reference, in their entirety.

TECHNICAL FIELD

The present disclosure relates to an exchange, a telephone exchange method, and a computer-readable medium.

BACKGROUND ART

As a related art, Patent Literature 1 discloses a communication system. The communication system described in Patent Literature 1 includes a private branch network and an operator network. The private branch network includes a private branch server, a plurality of extension terminals, and a gateway apparatus. Each of the extension terminals has an extension number. The operator network is an external communication network operated by a communication operator that provides a telephone communication service. The operator network includes a center server, a plurality of mobile telephone sets, and a gateway apparatus. A mobile telephone number is set to each of the mobile telephone sets. Not only the mobile telephone number but also an extension telephone number may be set to each of the mobile telephone sets.

In the private branch network, the private branch server performs call control of an extension call between extension terminals connected to an Internet Protocol (IP) network by using a predetermined call control protocol such as a Session Initiation Protocol (SIP). In the operator network, the center server performs call control of a call between mobile telephones in the operator network by using the predetermined call control protocol. The IP network of the private branch network is connected to the operator network via the gateway. The private branch server and the center server exchange call control messages according to the predetermined call control protocol, and perform call control between an extension terminal and a mobile telephone.

For example, a mobile telephone set having an extension number in the operator network originates a call to an extension terminal in the private branch network. The center server receives a calling signal having an extension number of the extension terminal as a called-side number. The center server transmits an INVITE message having a mobile telephone number of the mobile telephone set as a caller number to the private branch server. The private branch server acquires the extension number of the mobile telephone set on a calling side, and converts the caller number into the extension number. The private branch server calls the extension terminal using the converted extension number as the caller number. After an off-hook operation is performed in the extension terminal, a call between the extension terminal and the mobile telephone set is established.

CITATION LIST

Patent Literature

Patent Literature 1: Japanese Unexamined Patent Application Publication No. 2014-003577

SUMMARY OF INVENTION

Technical Problem

In Patent Literature 1, the private branch server and the center server can realize extension calls between the extension terminals connected to the private branch network and the mobile telephone sets connected to the operator network. However, in Patent Literature 1, the mobile telephone sets are accommodated in the center server in the operator network and are under the control of the center server. Therefore, the private branch server in the private branch network can provide the mobile telephone sets with only some of extension services that can be provided to the extension terminals in the private branch network.

In view of the above circumstances, an object of the present disclosure is to provide an exchange, a telephone exchange method, and a computer-readable medium which can provide various extension services to a terminal apparatus connected to an external exchange.

Solution to Problem

In order to achieve the above object, the present disclosure provides an exchange as a first aspect. The exchange includes: an extension control means for controlling a call of a terminal apparatus connected to an external exchange; a first gateway configured to transmit an outgoing call originated from the terminal apparatus to the extension control means and receive an outgoing call addressed to the terminal apparatus from the extension control means; a second gateway configured to receive the outgoing call originated from the terminal apparatus from the terminal apparatus via the external exchange, and transmit the outgoing call addressed to the terminal apparatus to the terminal apparatus via the external exchange, the second gateway being connected to the external exchange via a network; and a flow control means for routing the outgoing call originated from the terminal apparatus and the outgoing call addressed to the terminal apparatus between the first gateway and the second gateway. In the exchange, the first gateway registers an extension number of the terminal apparatus in the extension control means, and the extension control means processes, when receiving the outgoing call originated from the terminal apparatus from the first gateway, the outgoing call as an outgoing call from the extension number of the terminal apparatus, and transmits, when an outgoing call addressed to the extension number of the terminal apparatus is made, the outgoing call addressed to the terminal apparatus to the first gateway.

The present disclosure provides a telephone exchange method as a second aspect. The telephone exchange method includes: registering, by a first gateway connected to an extension control module that controls a call of a terminal apparatus connected to an external exchange, an extension number of the terminal apparatus in the extension control module; receiving, by a second gateway connected to the external exchange via a network, an outgoing call originated from the terminal apparatus via the external exchange; routing the outgoing call originated from the terminal apparatus from the second gateway to the first gateway; transmitting the outgoing call originated from the terminal apparatus from the first gateway to the extension control module; and processing, by the extension control module, the outgoing call as an outgoing call originated from the extension number of the terminal apparatus when the outgoing call originated from the terminal apparatus is received.

The present disclosure provides a telephone exchange method as a third aspect. The telephone exchange method includes: registering, by a first gateway connected to an extension control module that controls a call of a terminal apparatus connected to an external exchange, an extension number of the terminal apparatus in the extension control module; transmitting, by the extension control module, an outgoing call addressed to the terminal apparatus to the first gateway when the outgoing call addressed to the extension number of the terminal apparatus is made; receiving, by the first gateway, the outgoing call addressed to the terminal apparatus from the extension control module; routing the outgoing call addressed to the terminal apparatus from the first gateway to a second gateway connected to the external exchange via a network; and transmitting, by the second gateway, the outgoing call addressed to the terminal apparatus to the terminal apparatus via the external exchange.

The present disclosure provides a computer-readable medium storing a program as a fourth aspect. The program is configured to cause a computer to execute processing including: registering, by a first gateway connected to an extension control module that controls a call of a terminal apparatus connected to an external exchange, an extension number of the terminal apparatus in the extension control module; receiving, by a second gateway connected to the external exchange via a network, an outgoing call originated from the terminal apparatus via the external exchange; routing the outgoing call originated from the terminal apparatus from the second gateway to the first gateway; transmitting the outgoing call originated from the terminal apparatus from the first gateway to the extension control module; and processing, by the extension control module, the outgoing call as an outgoing call originated from the extension number of the terminal apparatus when the outgoing call originated from the terminal apparatus is received.

The present disclosure provides a computer-readable medium storing a program as a fifth aspect. The program is configured to cause a computer to execute processing including: registering, by a first gateway connected to an extension control module that controls a call of a terminal apparatus connected to an external exchange, an extension number of the terminal apparatus in the extension control module; transmitting, by the extension control module, an outgoing call addressed to the terminal apparatus to the first gateway when the outgoing call addressed to the extension number of the terminal apparatus is made; receiving, by the first gateway, the outgoing call addressed to the terminal apparatus from the extension control module; routing the outgoing call addressed to the terminal apparatus from the first gateway to a second gateway connected to the external exchange via a network; and transmitting, by the second gateway, the outgoing call addressed to the terminal apparatus to the terminal apparatus via the external exchange.

Advantageous Effects of Invention

The exchange, the telephone exchange method, and the computer-readable medium according to the present disclosure can provide various extension services to the terminal apparatus connected to the external exchange.

EXAMPLE EMBODIMENT

Figure 1:
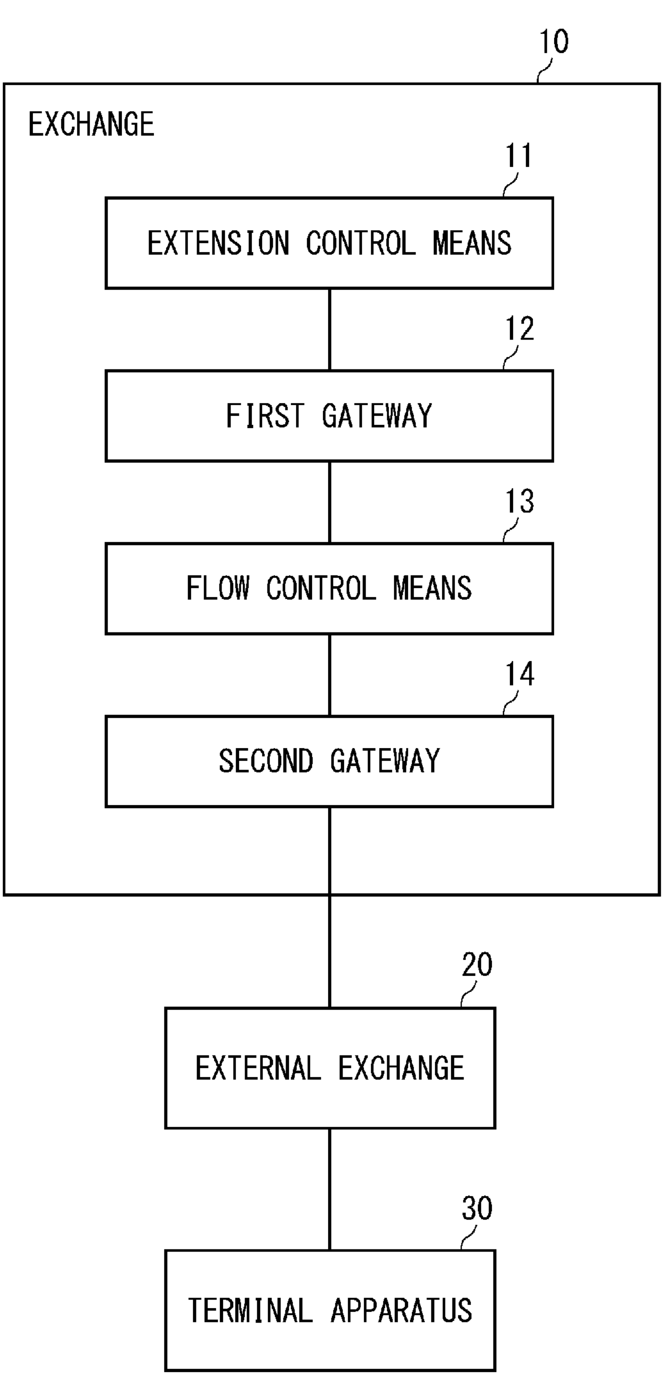
FIG. 1 is a block diagram illustrating a schematic configuration of an exchange according to the present disclosure.

Prior to describing example embodiments according to the present disclosure, an outline of the present disclosure will be described. FIG. 1 illustrates a schematic configuration of an exchange according to the present disclosure. An exchange 10 includes an extension control means 11, a first gateway 12, a flow control means 13, and a second gateway 14. The second gateway 14 is connected to an external exchange 20 via a network. A terminal apparatus 30 is connected to the external exchange 20. An extension number of the terminal apparatus 30 is set to the external exchange 20. The extension control means 11 controls a call from the terminal apparatus 30 connected to the external exchange 20.

The first gateway 12 transmits an outgoing call originated from the terminal apparatus 30 to the extension control means 11. In addition, the first gateway 12 receives an outgoing call addressed to the terminal apparatus 30 from the extension control means 11. The second gateway 14 receives the outgoing call originated from the terminal apparatus 30 via the external exchange 20 from the terminal apparatus 30. In addition, the second gateway 14 transmits the outgoing call addressed to the terminal apparatus 30 to the terminal apparatus 30 via the external exchange 20. The flow control means 13 routes the outgoing call originated from the terminal apparatus 30 and the outgoing call addressed to the terminal apparatus 30 between the first gateway 12 and the second gateway 14.

The first gateway 12 registers the extension number of the terminal apparatus 30 to the extension control means 11. When receiving the outgoing call originated from the terminal apparatus 30 from the first gateway 12, the extension control means 11 processes the outgoing call as an outgoing call from the extension number of the terminal apparatus 30. In addition, when an outgoing call addressed to the extension number of the terminal apparatus 30 is made, the extension control means 11 transmits the outgoing call addressed to the terminal apparatus 30 to the first gateway 12.

In the present disclosure, the first gateway 12 and the second gateway 14 are disposed between the extension control means 11 and the external exchange 20. In addition, an outgoing call is transmitted and received between the extension control means 11 and the first gateway 12, and an outgoing call is transmitted and received between the external exchange 20 and the second gateway 14. The flow control means 13 routes the outgoing calls between the first gateway 12 and the second gateway 14. In this manner, the extension control means 11 can control a call of the terminal apparatus 30 connected to the external exchange 20 by communicating with the first gateway 12 according to a predetermined communication protocol. Therefore, the exchange 10 according to the present disclosure can provide the terminal apparatus 30 connected to the external exchange 20 with various extension services that can be provided by the exchange 10.

The example embodiments according to the present disclosure will be described hereinafter in detail with reference to the drawings. Note that omission and simplification are made as appropriate in the description and drawings described below for clarity of description. In addition, in each of the drawings described below, the same elements and similar elements are denoted by the same reference signs, and a duplicate description is omitted as necessary.

Figure 2:
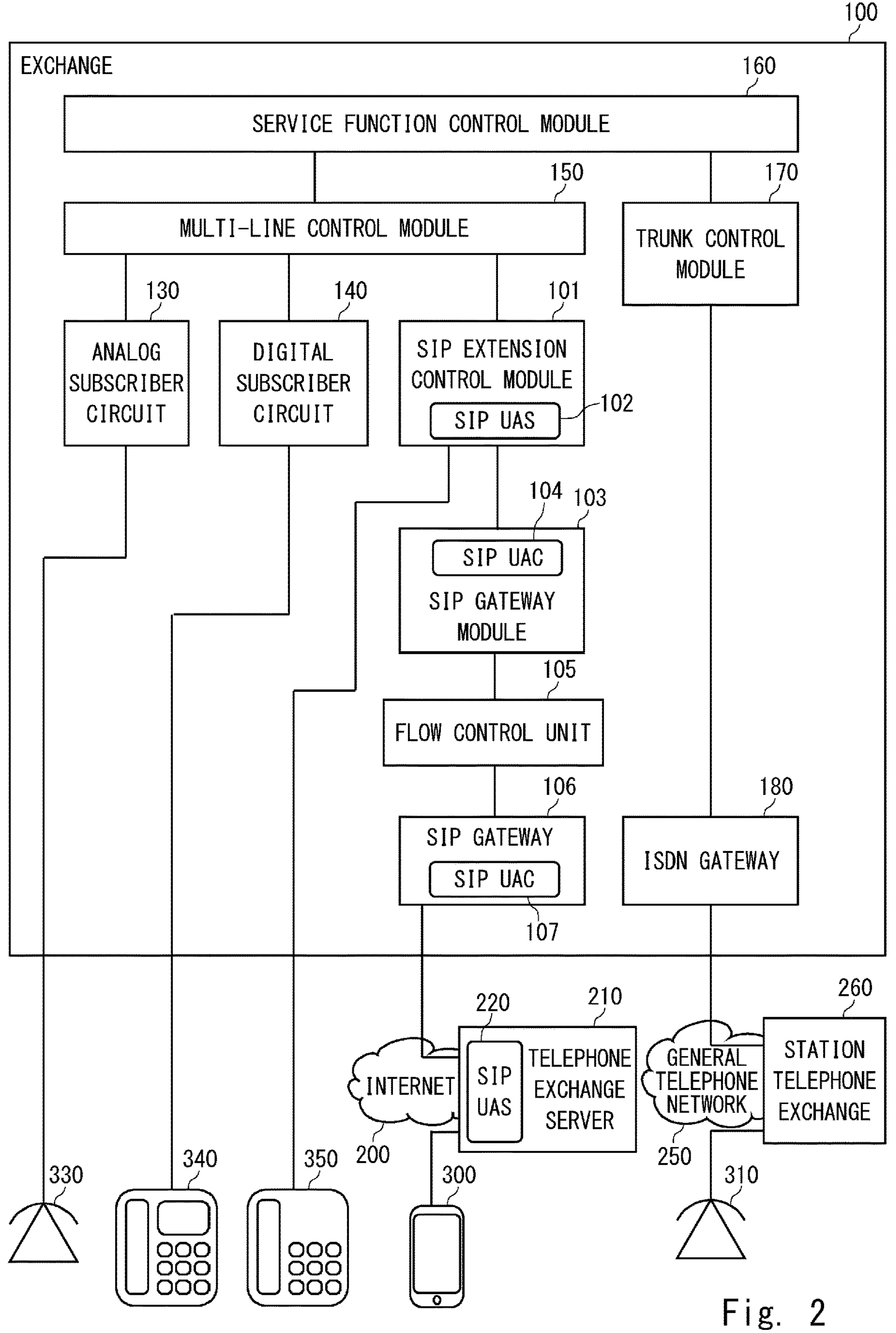
FIG. 2 is a block diagram illustrating an exchange according to a first example embodiment of the present disclosure.

FIG. 2 illustrates an exchange according to a first example embodiment of the present disclosure. An exchange 100 includes a SIP extension control module 101, a SIP gateway module 103, a flow control unit 105, a SIP gateway 106, an analog subscriber circuit 130, a digital subscriber circuit 140, a multi-line control module 150, a service function control module 160, a trunk control module 170, and an Integrated Services Digital Network (ISDN) gateway 180. At least some of functions of the respective units in the exchange 100 can be realized by at least one processor operating according to a program read from at least one memory. The exchange 100 corresponds to the exchange 10 illustrated in FIG. 1.

The SIP extension control module 101 is connected to a SIP telephone set 350 accommodated in the exchange 100 and the SIP gateway module 103. The SIP telephone set 350 is a telephone set used as an extension telephone set. The SIP telephone set 350 is connected to the SIP extension control module 101 through, for example, private branch wiring. The SIP extension control module 101 includes a SIP user agent server (UAS) 102. The SIP gateway module 103 includes a SIP user agent client (UAC) 104. Although not illustrated in FIG. 2, the SIP telephone set 350 includes a SIP UAC. Communication is performed according to the SIP between the SIP extension control module 101 and each of the SIP telephone set 350 and the SIP gateway module 103. The SIP extension control module 101 corresponds to the extension control means 11 illustrated in FIG. 1.

The SIP gateway module 103 is connected to the SIP gateway 106 via the flow control unit 105. The SIP gateway 106 is connected to a network such as the Internet 200 via a SIP-dedicated line. The Internet 200 includes a telephone exchange server (cloud telephone exchange server) 210 that is an external exchange. The SIP gateway 106 includes a SIP UAC 107, and the telephone exchange server 210 includes a SIP UAS 220. The telephone exchange server 210 accommodates one or more external telephone sets 300. The external telephone set 300 is configured as a device such as a smartphone, a tablet, a personal computer (PC), or a telephone set on which a telephone client application runs. An extension number is assigned to the external telephone set 300. It is assumed that a subscriber number of the external telephone set 300 in the telephone exchange server 210 and the extension number of the external telephone set 300 in the exchange 100 are the same number. Hereinafter, the extension number assigned to the external telephone set 300 is also referred to as a bridge extension number for convenience. For example, the bridge extension number is set as a number ranging from 4000 to 4999. The telephone exchange server 210 corresponds to the external exchange 20 illustrated in FIG. 1. The external telephone set 300 corresponds to the terminal apparatus 30 illustrated in FIG. 1.

The SIP extension control module 101 controls calls of the SIP telephone set 350 and the external telephone set 300 connected to the telephone exchange server 210. The SIP gateway module 103 registers the bridge extension number of the external telephone set 300 to the SIP extension control module 101. For example, the SIP UAC 104 of the SIP gateway module 103 registers the bridge extension number of the external telephone set 300 to the SIP UAS 102 of the SIP extension control module 101. The SIP UAC 104 appears to the SIP extension control module 101 as (a terminal of) an extension telephone with the bridge extension number accommodated in the exchange 100. The SIP gateway module 103 corresponds to the first gateway 12 illustrated in FIG. 1.

The flow control unit 105 routes a call originated from the external telephone set 300 and a call addressed to the external telephone set 300 between the SIP gateway module 103 and the SIP gateway 106. For example, the flow control unit 105 uses a predetermined trunk access code (TAC) to route the call originated from the external telephone set 300 and the call addressed to the external telephone set 300 between the SIP gateway module 103 and the SIP gateway 106. The flow control unit 105 corresponds to the flow control means 13 illustrated in FIG. 1. The SIP gateway 106 corresponds to the second gateway 14 illustrated in FIG. 1.

In the present example embodiment, the external telephone set 300 is connected to the exchange 100 via the SIP-dedicated line and the telephone exchange server 210. The SIP gateway module 103, the flow control unit 105, and the SIP gateway 106 are used to convert a call of the external telephone set 300 into a call of an extension telephone set in the exchange 100.

When a call addressed to the bridge extension number of the external telephone set 300 is made, the SIP extension control module 101 transmits, to the SIP gateway module 103, an outgoing call addressed to the external telephone set 300. The SIP gateway module 103 receives the outgoing call addressed to the external telephone set 300 from the SIP extension control module 101. The flow control unit 105 routes, to the SIP gateway 106, the outgoing call received by the SIP gateway module 103 from the SIP extension control module 101. The SIP gateway 106 receives, from the flow control unit 105, the outgoing call addressed to the external telephone set 300. The SIP gateway 106 transmits the received outgoing call addressed to the external telephone set 300 to the external telephone set 300 via the telephone exchange server 210.

When making an outgoing call to another extension accommodated in the exchange 100 or an external line through the exchange 100, the external telephone set 300 transmits an outgoing call originated from the external telephone set 300 to the SIP gateway 106 via the telephone exchange server 210. The SIP gateway 106 receives the outgoing call originated from the external telephone set 300 via the telephone exchange server 210 from the external telephone set 300. The flow control unit 105 routes the outgoing call received by the SIP gateway 106 to the SIP gateway module 103. The SIP gateway module 103 receives, from the flow control unit 105, the outgoing call originated from the external telephone set 300. The SIP gateway module 103 transmits, to the SIP extension control module 101, the received outgoing call originated from the external telephone set 300. When receiving the outgoing call originated from the external telephone set 300 from the SIP gateway module 103, the SIP extension control module 101 processes the outgoing call as an outgoing call from the bridge extension number.

The digital subscriber circuit 140 is connected to a digital telephone set 340 accommodated in the exchange 100. The digital telephone set 340 is a digital extension telephone terminal connected to the digital subscriber circuit 140 via a digital line. The digital telephone set 340 is configured as a multi-function telephone set having line buttons, for example. The digital telephone set 340 may be an IP multi-function telephone set connected to an IP multi-function extension control module (not illustrated) via an IP communication network.

The analog subscriber circuit 130 is connected to the analog telephone set 330 accommodated in the exchange 100. The analog telephone set 330 is an analog extension telephone terminal connected to the analog subscriber circuit 130 via an analog line. In the following description, the analog telephone set 330, the digital telephone set 340, and the SIP telephone set 350 are also referred to as extensions accommodated in the exchange 100.

The trunk control module 170 is connected to the ISDN gateway 180. The ISDN gateway 180 is connected to a general telephone network 250 which is a public network. The general telephone network 250 includes a station telephone exchange 260. The station telephone exchange 260 accommodates one or more station-line telephone sets 310. The station-line telephone set 310 accommodated in the station telephone exchange 260 may include a telephone set used as an extension telephone terminal and a telephone set used as an external-line telephone terminal. The ISDN gateway 180 is connected to the station-line telephone set 310 via the station telephone exchange 260.

The service function control module 160 provides basic extension services such as reception of an external-line call, origination of an external-line call, an extension call, and transfer. The multi-line control module (multi-line control means) 150 controls the line buttons of the digital telephone set 340. In a case where the external telephone set 300 is called from an extension or a station line accommodated in the exchange 100, the multi-line control module 150 lights a line button corresponding to the bridge extension number. In addition, the multi-line control module 150 may cause the digital telephone set 340 having the line button on a board surface to ring. It is assumed that which number of the line button the digital telephone set 340 has on the board surface is managed using a multi-function extension board surface database.

When the bridge extension number is in use, the multi-line control module 150 lights the line button corresponding to the bridge extension number. For example, the multi-line control module 150 lights the line button corresponding to a bridge extension number when the external telephone set 300 originates a call to an extension accommodated in the exchange 100 or a station line. In addition, the multi-line control module 150 can light the line button corresponding to the bridge extension number when the external telephone set 300 responds to the call made to the external telephone set 300 from the extension accommodated in the exchange 100 or the station line. A user of the digital telephone set 340 can press the line button on the digital telephone set 340 while a call is being established between the external telephone set 300 and the extension line or the station line accommodated in the exchange 100 are talking. When a light button is pressed on the digital telephone set 340, the multi-line control module 150 can notify the service function control module 160 of such an event, and cause the digital telephone set 340 to join the call. The multi-line control module 150 can provide the above-described function to the SIP extension control module 101, the analog subscriber circuit 130, and the digital subscriber circuit 140.

Figure 3:
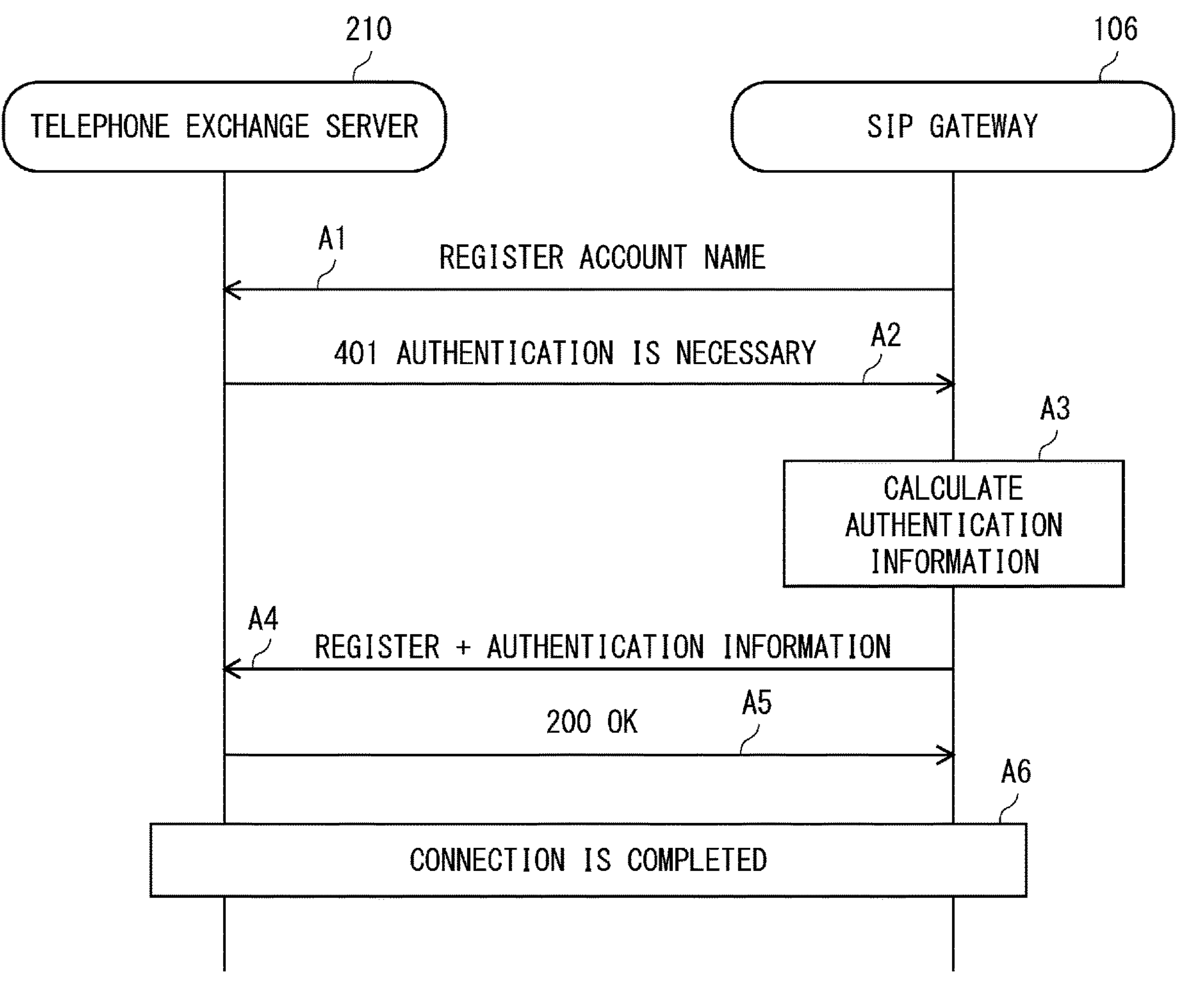
FIG. 3 is a sequence diagram illustrating registration to a telephone exchange server.

Next, an operation procedure will be described. FIG. 3 illustrates registration to the telephone exchange server 210. An administrator operating the exchange 100 registers authentication information for connection to the telephone exchange server 210, for example, an account name and a password, to a database (not illustrated) in the exchange 100. The account name and the password are distributed from an operator by a line contract with the operator. The SIP gateway 106 (the SIP UAC 107) transmits a REGISTER request to the telephone exchange server 210 (the SIP UAS 220) (step A1). In step A1, the SIP gateway 106 transmits the account name to the telephone exchange server 210. The telephone exchange server 210 returns, to the SIP gateway 106, a response indicating that authentication is necessary (step A2).

The SIP gateway 106 calculates authentication information from information such as the password (step A3). The SIP gateway 106 transmits the REGISTER request including the authentication information calculated in step A3 to the telephone exchange server 210 (step A4). If there is no problem in the received REGISTER request, the telephone exchange server 210 returns a response of "200 OK" to the SIP gateway 106 (step A5). Thereafter, the connection between the SIP gateway 106 and the telephone exchange server 210 is completed (step A6).

Figure 4:
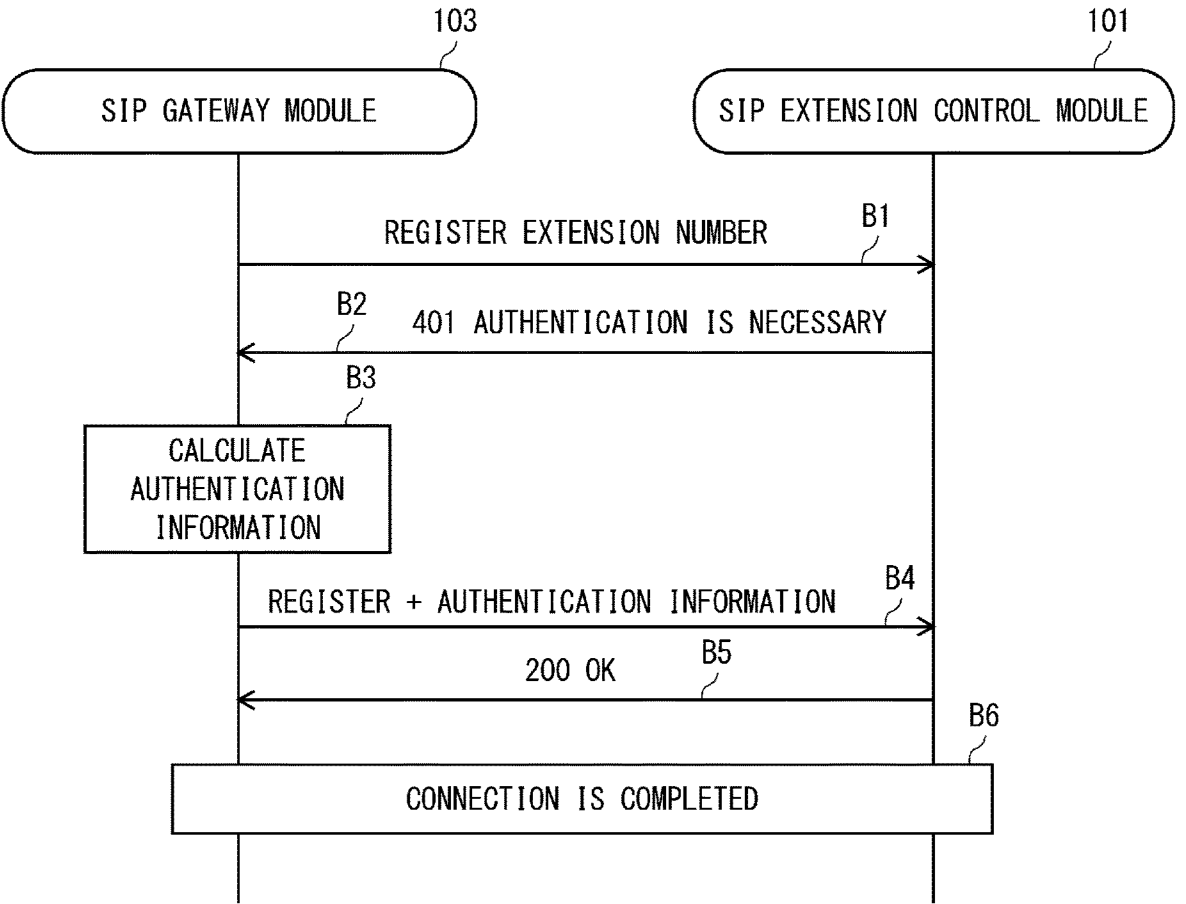
FIG. 4 is a sequence diagram illustrating registration to a SIP extension control module.

FIG. 4 illustrates registration to the SIP extension control module 101. The SIP gateway module 103 (the SIP UAC 104 thereof) transmits a REGISTER request to (the SIP UAS 102 of) the SIP extension control module 101 (step B1). The SIP gateway module 103 transmits a bridge extension number to the telephone exchange server 210 in step B1. The SIP extension control module 101 returns a response indicating that authentication is required to the SIP gateway module 103 (step B2).

The SIP gateway module 103 calculates authentication information from information such as an authentication password set for each bridge extension number (step B3). The SIP gateway module 103 transmits the REGISTER request including the authentication information calculated in step B3 to the SIP extension control module 101 (step B4). If there is no problem in the received REGISTER request, the SIP extension control module 101 returns a response of "200 OK" to the SIP gateway module 103 (step B5). Thereafter, the connection between the SIP extension control module 101 and the SIP gateway module 103 is completed (step B6). The SIP gateway module 103 registers the bridge extension number to the SIP extension control module 101 for each of the plurality of external telephone sets 300.

Figure 5:
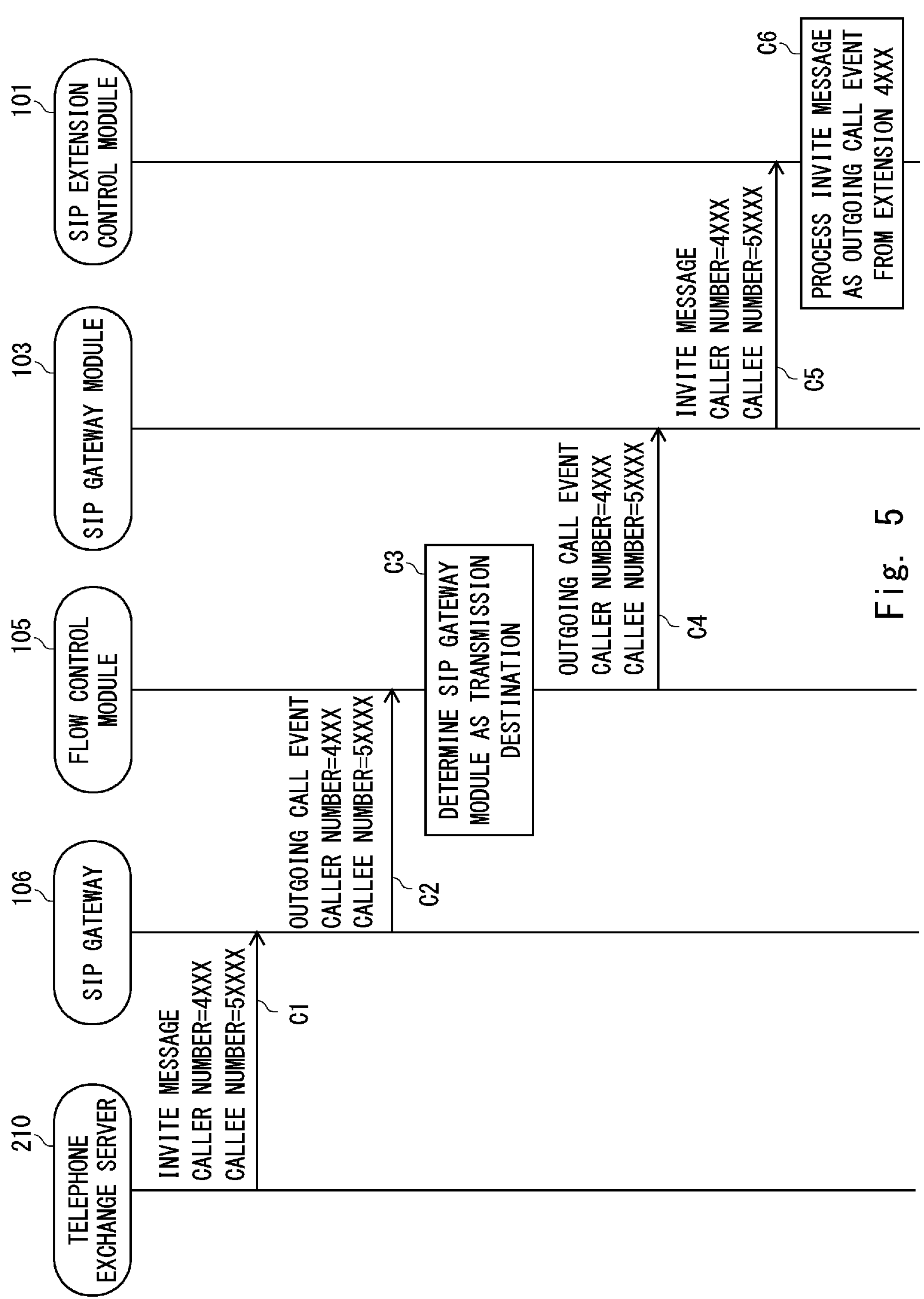
FIG. 5 is a sequence diagram illustrating an operation procedure in a case where an external telephone set calls an extension.

FIG. 5 illustrates an operation procedure (a telephone exchange method) in a case where the external telephone set 300 calls an extension. The external telephone set 300 transmits, to the telephone exchange server 210, an outgoing call message including a bridge extension number set in the external telephone set 300 as a caller number. Here, it is assumed that the bridge extension number set in the external telephone set 300 is "4XXX", and a callee number (destination number) is "5XXX". The telephone exchange server 210 transmits an INVITE message to the SIP gateway 106 (step C1). The INVITE message includes the caller number "4XXX" and the callee number "5XXX".

When receiving the INVITE message, the SIP gateway 106 transmits an outgoing call event from the external telephone set 300 to the flow control unit 105 (step C2). The outgoing call event includes the caller number "4XXX" and the callee number "5XXX". The flow control unit 105 recognizes that the outgoing call event is an event from a bridge extension, and determines the SIP gateway module 103 as a transmission destination of the outgoing call event (step C3). The flow control unit 105 transmits the outgoing call event received from the SIP gateway 106 to the SIP gateway module 103 (step C4). In step C4, the flow control unit 105 routes the outgoing call event to the SIP gateway module 103, for example, by adding a predetermined TAC to the outgoing call event.

When receiving the outgoing call event, the SIP gateway module 103 transmits an INVITE message to the SIP extension control module 101 (step C5). The INVITE message includes the caller number "4XXX" and the callee number "5XXX". When receiving the INVITE message, the SIP extension control module 101 processes the INVITE message as an outgoing call event from the bridge extension number "4XXX" (step C6).

When a call is made from a bridge extension number to, for example, an extension number of the analog telephone set 330, the SIP extension control module 101 notifies the service function control module 160 of such an event. The service function control module 160 instructs the multi-line control module 150 to output a ringing instruction to the analog subscriber circuit 130 that accommodates the analog telephone set 330. The multi-line control module 150 refers to the multi-function extension board surface database, and determines whether or not the bridge extension number originating the call has been registered as a line button on the board surface of the digital telephone set 340. When determining that the bridge extension number has been registered, the multi-line control module 150 outputs the ringing instruction to the digital subscriber circuit 140. In addition, the multi-line control module 150 also instructs the digital subscriber circuit 140 to light the line button of the digital telephone set 340. In this manner, the user of the digital telephone set 340 can easily recognize that the external telephone set 300 has established the call via the exchange 100.

While the external telephone set 300 is making a call with the analog telephone set 330 accommodated in the exchange 100, the line button for the bridge extension number of the external telephone set 300 is lit on the digital telephone set 340. In this state, when the line button is pressed on the digital telephone set 340, the service function control module 160 is notified of such an event. When the line button for the bridge extension number of the external telephone set 300 is pressed, the service function control module 160 causes the external telephone set 300, the analog telephone set 330, and the digital telephone set 340 to establish a three-way conference call. In that case, the service function control module 160 instructs the analog subscriber circuit 130, the SIP UAC 104 operating as the external telephone set 300, the digital subscriber circuit 140, and a conference call apparatus (not illustrated) to establish the three-way conference call. Each unit (each apparatus) having received the instruction from the service function control module 160 performs processing of switching a communication path to the conference call apparatus in order to implement the three-way conference call. In this manner, the digital telephone set 340 can be made to join the call between the external telephone set 300 and the analog telephone set 330, and the three-way call becomes possible among the external telephone set 300, the analog telephone set 330, and the digital telephone set 340.

Figure 6:
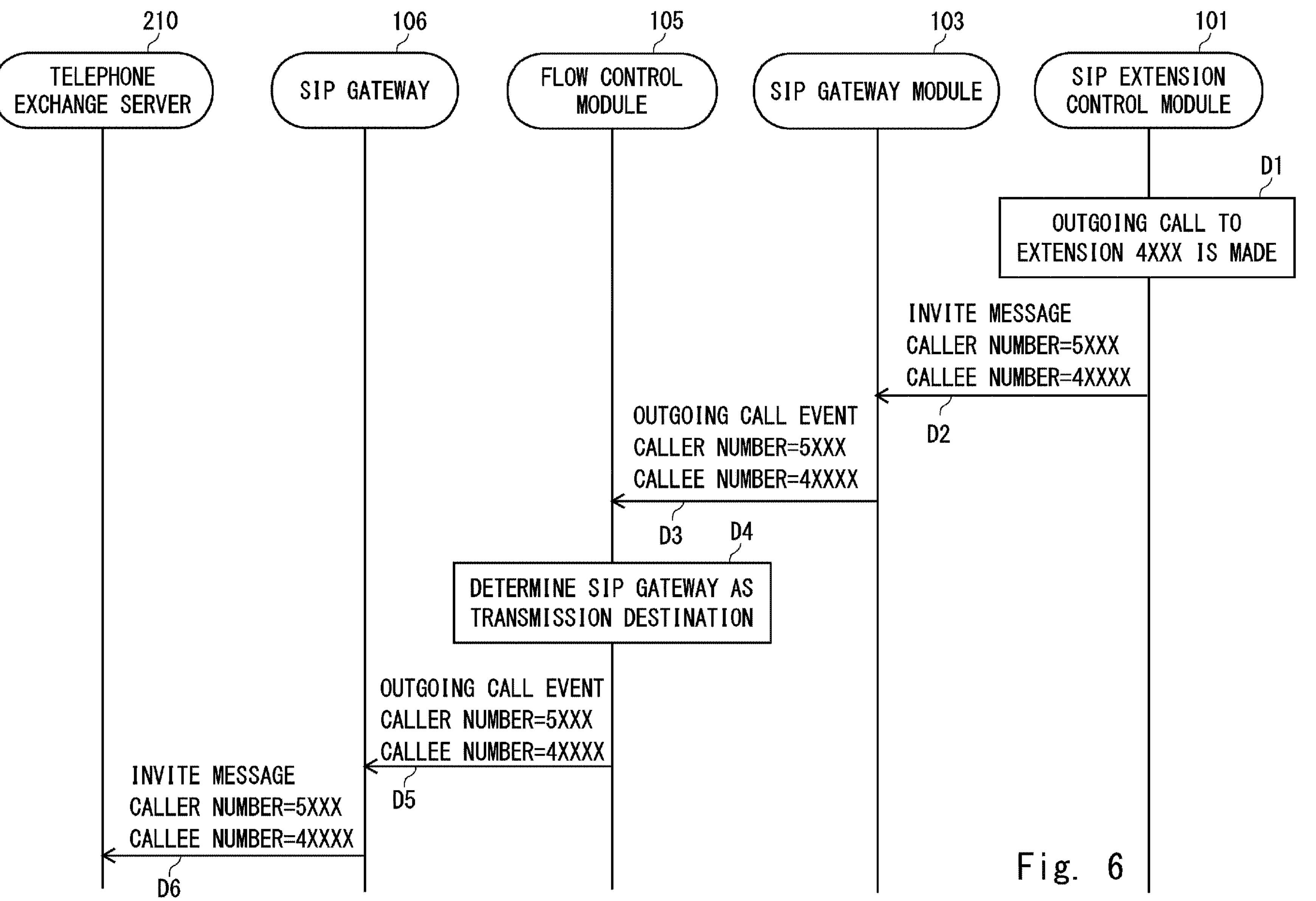
FIG. 6 is a sequence diagram illustrating an operation procedure in a case where the external telephone set is called.

FIG. 6 illustrates an operation procedure in a case where the external telephone set 300 is called. In the SIP extension control module 101, an outgoing call to a bridge extension number "4XXX" is made (step D1). The SIP extension control module 101 transmits an INVITE message to the SIP gateway module 103 (step D2). The INVITE message includes, for example, a caller number "5XXX" and a callee number "4XXX". When receiving the INVITE message, the SIP gateway module 103 transmits, to the flow control unit 105, an outgoing call event with respect to the external telephone set 300 (step D3). The outgoing call event includes the caller number "5XXX" and the callee number "4XXX".

The flow control unit 105 recognizes that the outgoing call event is an event with respect to a bridge extension, and determines the SIP gateway 106 as a transmission destination of the outgoing call event (step D4). The flow control unit 105 transmits the outgoing call event received from the SIP gateway module 103 to the SIP gateway 106 (step D5). In step D5, the flow control unit 105 routes the outgoing call event to the SIP gateway 106, for example, by adding a predetermined TAC to the outgoing call event.

When receiving the outgoing call event, the SIP gateway 106 transmits an INVITE message to the telephone exchange server 210 (step D6). The INVITE message includes the caller number "5XXX" and the callee number "4XXX". The telephone exchange server 210 transmits the received INVITE message to the external telephone set 300.

For example, in a case where the external telephone set 300 is called from the analog telephone set 330, the analog subscriber circuit 130 notifies the service function control module 160 of such an event. The service function control module 160 instructs the multi-line control module 150 to output a ringing instruction to the SIP extension control module 101. The multi-line control module 150 refers to the multi-function extension board surface database, and determines whether or not the bridge extension number receiving the call has been registered as a line button on the board surface of the digital telephone set 340. When determining that the bridge extension number has been registered, the multi-line control module 150 outputs the ringing instruction to the digital subscriber circuit 140. In addition, the multi-line control module 150 instructs the digital subscriber circuit 140 to light the line button of the digital telephone set 340 when the external telephone set 300 with the bridge extension number responds. When the line button is pressed on the digital telephone set 340 after the call is initiated, the service function control module 160 causes the digital telephone set 340 to join the call between the external telephone set 300 and the analog telephone set 330. When the external telephone set 300 does not respond to the calling but the digital telephone set 340 responds to the calling, the multi-line control module 150 causes the external telephone set 300 to stop ringing.

Note that the SIP telephone set 350 transmits an INVITE message to SIP extension control module 101 in a case where the SIP telephone set 350 (see FIG. 2) calls an extension. In that case, the SIP extension control module 101 processes the INVITE message as an outgoing call event from the SIP telephone set 350. The SIP extension control module 101 transmits the INVITE message to the SIP telephone set 350 in a case where the SIP telephone set 350 is called.

In general, in a protocol called SIP that is most widely used as a protocol for handling voice exchange on an IP network, a side to be controlled is referred to as a SIP UAC, and a controlling side is referred to as a SIP UAS. When a SIP extension is given as an example, a SIP extension terminal is a UAC, and a module that controls the SIP extension terminal is a UAS. When an exchange is connected to a telephone exchange server on a cloud via the Internet, a SIP gateway becomes the UAC, and the telephone exchange server on the cloud becomes the UAS.

In the present example embodiment, the SIP gateway 106 is connected to the SIP gateway module 103 via the flow control unit 105. A function of the SIP gateway module 103 may be the same as a function of the SIP gateway used for a cloud telephone service. In the present example embodiment, the SIP gateway module 103 is used as the SIP UAC connected to the SIP extension control module 101 in the exchange 100. In other words, the SIP gateway module 103 is used as a client controlled in the exchange 100. When a message is appropriately routed between the SIP gateway module 103 and the SIP gateway 106 in the flow control unit 105, the external telephone set 300 can be treated as a telephone set that can be directly controlled by the exchange 100. Therefore, a service such as a SIP extension can be implemented for the external telephone set 300 in the present example embodiment.

Here, in the exchange 100, the ISDN gateway 180 is connected to the trunk control module 170. The multi-line control module 150 and the trunk control module 170 are under control of the service function control module 160, and the multi-line control module 150 is not able to control the trunk control module 170. The station-line telephone set 310 connected to the general telephone network 250 is connected to the exchange 100 via an ISDN trunk station line. The station-line telephone set 310 can use services such as basic call origination and reception, a dial-in service, and caller number notification provided by the service function control module 160. However, the station-line telephone set 310 is not able to use a service (extension service) provided by the multi-line control module 150. Assuming that the SIP gateway 106 is connected to the trunk control module 170, the external telephone set 300 is not able to use the extension service provided by multi-line control module 150. In the present example embodiment, the external telephone set 300 can be controlled by the SIP extension control module 101, and can utilize the extension service provided by the multi-line control module 150 in addition to the services provided by the service function control module 160.

Figure 7:
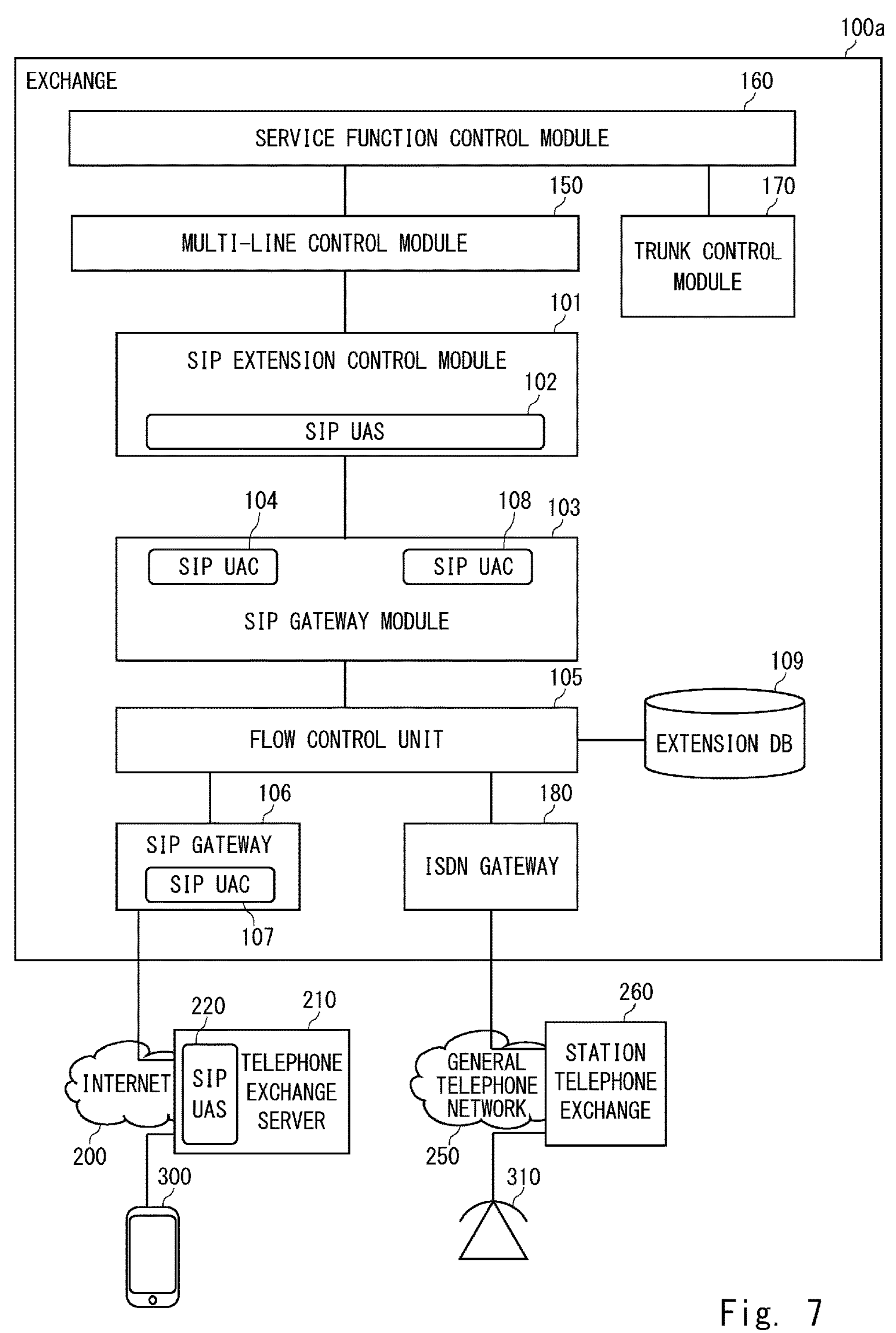
FIG. 7 is a block diagram illustrating an exchange according to a second example embodiment of the present disclosure.

Next, a second example embodiment of the present disclosure will be described. FIG. 7 illustrates an exchange according to the second example embodiment of the present disclosure. An exchange 100*a* according to the present example embodiment is different from the exchange 100 according to the first example embodiment illustrated in FIG. 2 in that the ISDN gateway 180 is connected to the flow control unit 105. Note that the analog subscriber circuit 130, the digital subscriber circuit 140, the analog telephone set 330, the digital telephone set 340, and the SIP telephone set 350 are not illustrated in FIG. 7.

In the present example embodiment, in addition to the operations described in the first example embodiment, the flow control unit 105 routes, between the SIP gateway module 103 and the ISDN gateway 180, an outgoing call originated from the station-line telephone set 310 having a station line number and a bridge extension number corresponding to the station line number and an outgoing call addressed to the station-line telephone set 310. The SIP gateway module 103 includes a SIP UAC 108 in addition to the SIP UAC 104. The SIP UAC 108 registers, to the SIP UAS 102 of the SIP extension control module 101, the bridge extension number assigned to the station-line telephone set 310.

The flow control unit 105 holds a routing rule that associates a bridge extension number and a station line number with a routing destination of a call of the bridge extension number and the station line number. In the routing rule, for example, a station line number for which a routing destination of an outgoing call event is the SIP gateway module 103 is stored. The flow control unit 105 may determine a routing destination of an outgoing call event according to the routing rule and a caller number or a callee number included in the outgoing call event.

When receiving an outgoing call event from the ISDN gateway 180, the flow control unit 105 determines whether or not the routing rule includes a caller number included in the outgoing call event. When determining that the caller number is included in the routing rule, the flow control unit 105 determines a routing destination of the outgoing call event as the SIP gateway module 103. When determining that the caller number is not included in the routing rule, the flow control unit 105 determines the routing destination of the outgoing call event as the trunk control module 170. When receiving an outgoing call event from the SIP gateway 106 connected to a SIP-dedicated line, the flow control unit 105 may determine a routing destination of the outgoing call event as the SIP gateway module 103 without referring to the routing rule.

An extension database (DB) 109 stores a station line number and a bridge extension number corresponding to the station line number. The flow control unit 105 checks whether or not a caller number or a callee number included in an outgoing call event is registered in the extension DB 109. When the caller number or the callee number is registered in the extension DB 109, the flow control unit 105 acquires a bridge extension number corresponding to the caller number or the callee number from the extension DB 109. The flow control unit 105 replaces the caller number or the callee number included in the outgoing call event with the acquired bridge extension number.

Figure 8:
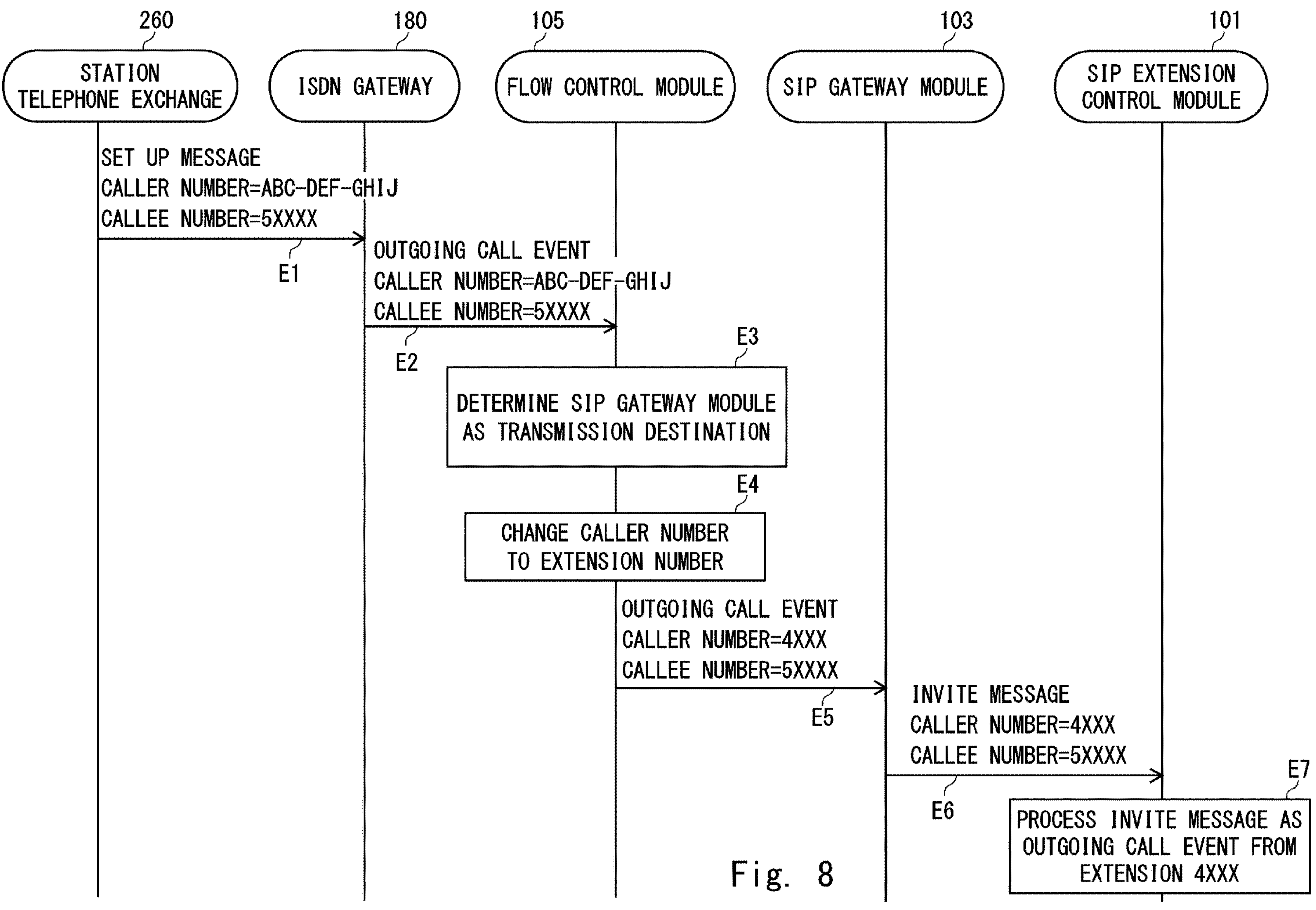
FIG. 8 is a sequence diagram illustrating an operation procedure in a case where a station-line telephone set calls an extension.

FIG. 8 illustrates an operation procedure (a telephone exchange method) in a case where the station-line telephone set 310 calls an extension. The station-line telephone set 310 transmits an outgoing call message including a station line number of the station-line telephone set 310 as a caller number to the station telephone exchange 260. Here, it is assumed that the station line number of the station-line telephone set 310 is “ABC-DEF-GHIJ”, and a callee number is “5XXX”. The station telephone exchange 260 transmits a SET UP message to the ISDN gateway 180 (step E1). The SET UP message includes the caller number “ABC-DEF-GHIJ” and the callee number “5XXX”.

When receiving the SET UP message, the ISDN gateway 180 transmits an outgoing call event from the station-line telephone set 310 to the flow control unit 105 (step E2). The outgoing call event includes the caller number “ABC-DEF-GHIJ” and the callee number “5XXX”. The flow control unit 105 refers to the routing rule and checks whether or not the station line number “ABC-DEF-GHIJ” is stored in the routing rule. When the routing rule includes the station line number “ABC-DEF-GHIJ”, the flow control unit 105 recognizes that the outgoing call event is an event from a bridge extension. In this case, the flow control unit 105 determine the SIP gateway module 103 as a transmission destination of the outgoing call event (step E3).

When a routing destination of the outgoing call event is the SIP gateway module 103, the flow control unit 105 refers to the extension DB 109 and acquires a bridge extension number corresponding to the caller number included in the outgoing call event. For example, the flow control unit 105 acquires the bridge extension number "4XXX" corresponding to the station line number "ABC-DEF-GHIJ" from the extension DB 109. When the bridge extension number corresponding to the caller number (station line number) is acquired, the flow control unit 105 may determine the SIP gateway module as a transmission destination of the outgoing call event. The flow control unit 105 changes the caller number included in the outgoing call event to the bridge extension number "4XXX" acquired from the station line number "ABC-DEF-GHIJ" (step E4). The flow control unit 105 transmits the outgoing call event in which the caller number has been replaced with the bridge extension number to the SIP gateway module 103 (step E5). In step E5, the flow control unit 105 routes the outgoing call event to the SIP gateway module 103, for example, by adding a predetermined TAC to the outgoing call event.

When receiving the outgoing call event, the SIP gateway module 103 transmits an INVITE message to the SIP extension control module 101 (step E6). The INVITE message includes the caller number "4XXX" and the callee number "5XXX". When receiving the outgoing call event, the SIP extension control module 101 processes the outgoing call event as the outgoing call event from the bridge extension number "4XXX" (step E7).

Figure 9:
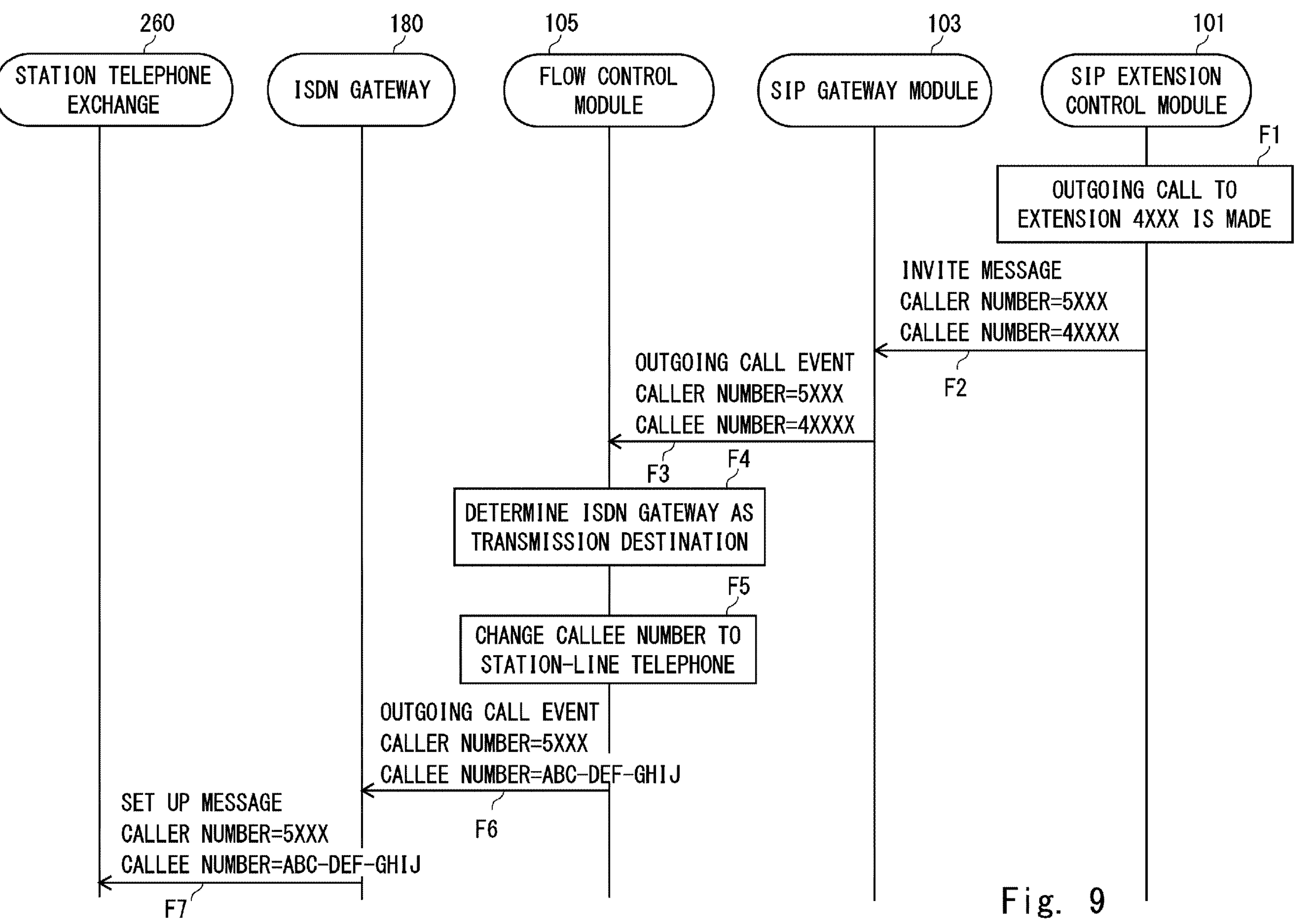
FIG. 9 is a sequence diagram illustrating an operation procedure in a case where the station-line telephone set is called.

FIG. 9 illustrates an operation procedure in a case where the station-line telephone set 310 is called. In the SIP extension control module 101, an outgoing call to a bridge extension number "4XXX" is made (step F1). The SIP extension control module 101 transmits an INVITE message to the SIP gateway module 103 (step F2). The INVITE message includes, for example, a caller number "5XXX" and a callee number "4XXX". When receiving the INVITE message, the SIP gateway module 103 transmits an outgoing call event to the flow control unit 105 (step F3). The outgoing call event includes the caller number "5XXX" and the callee number "4XXX".

The flow control unit 105 refers to the routing rule and determines a transmission destination of the outgoing call event with the callee number "4XXX". When the callee number "4XXX" corresponds to a station line number "ABC-DEF-GHIJ", the flow control unit 105 determines the ISDN gateway 180 as a transmission destination of the outgoing call event (step F4). If the callee number "4XXX" is a bridge extension number of an external telephone set connected to the telephone exchange server 210, the flow control unit 105 determines the SIP gateway 106 as a routing destination of the outgoing call event.

The flow control unit 105 refers to the extension DB 109 and acquires a station line number corresponding to the callee number "4XXX" included in the outgoing call event. The flow control unit 105 acquires the station line number "ABC-DEF-GHIJ" corresponding to the callee number "4XXX" from the extension DB 109, for example. The flow control unit 105 may determine a routing destination of the outgoing call event according to the acquired station line number. The flow control unit 105 changes the callee number included in the outgoing call event to the acquired station line number "ABC-DEF-GHIJ" (step F5).

The flow control unit 105 transmits the outgoing call event in which the callee number has been replaced with the station line number to the ISDN gateway 180 (step F6). In step F6, the flow control unit 105 routes the outgoing call event to the ISDN gateway 180, for example, by adding a predetermined TAC to the outgoing call event. When receiving the outgoing call event, the ISDN gateway 180 transmits a SET UP message to the station telephone exchange 260 (step F7). The SET UP message includes the caller number "5XXX" and the callee number "ABC-DEF-GHIJ". The station telephone exchange 260 transmits the received SET UP message to the station-line telephone set 310.

Note that the external telephone set 300 originates a call by using a station line number in a case where the SIP gateway 106 is connected to the telephone exchange server 210 via a public network (station line) instead of the SIP-dedicated line. In this case, the flow control unit 105 may perform processing similar to the above-described processing for the station-line telephone set 310 to exchange a telephone number of the external telephone set 300 with a bridge extension number. In addition, the flow control unit 105 may route an outgoing call event between SIP gateway module 103 and the SIP gateway 106. The extension DB 109 may store the station line number and the bridge extension number of the external telephone set 300 in addition to a station line number and a bridge extension number of the station-line telephone set 310.

In the present example embodiment, the flow control unit 105 routes, between the SIP gateway module 103 and the ISDN gateway 180, an outgoing call event originated from the station-line telephone set 310 and an outgoing call event whose callee is the station-line telephone set 310. In this manner, the exchange 100 can treat the station-line telephone set 310 connected to the station telephone exchange 260, which is an external exchange, as an extension telephone terminal. Other effects are similar to those described in the first example embodiment.

Figure 10:
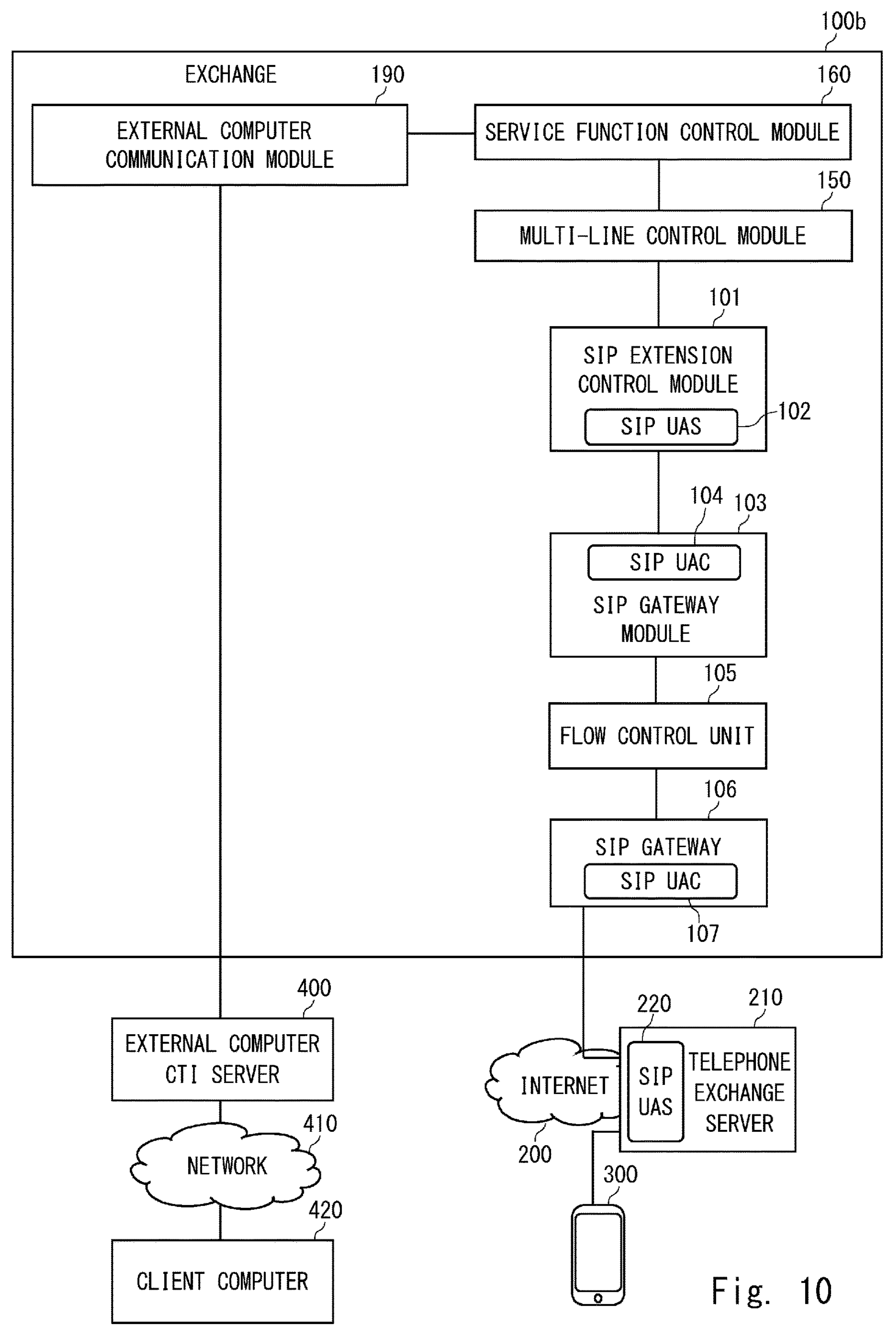
FIG. 10 is a block diagram illustrating an exchange according to a third example embodiment of the present disclosure.

Next, a third example embodiment of the present disclosure will be described. FIG. 10 illustrates an exchange according to the third example embodiment of the present disclosure. An exchange 100*b* according to the present example embodiment includes an external computer communication module 190 in addition to the configurations of the exchange according to the first example embodiment illustrated in FIG. 2. Note that the analog subscriber circuit 130, the digital subscriber circuit 140, the trunk control module 170, the ISDN gateway 180, the station-line telephone set 310, the analog telephone set 330, the digital telephone set 340, and the SIP telephone set 350 are not illustrated in FIG. 10.

The external computer communication module (external computer control means) 190 is connected to one or more external computers. The external computer includes at least one of an external computer computer telephony integration (CTI) server 400, a call distribution control computer 430, and a statistical information management server 440. The external computer CTI server 400 communicates with the external computer communication module 190 using a predetermined communication protocol. The external computer CTI server 400 is connected to a client computer 420 via a network 410 such as the Internet. The client computer 420 is a computer apparatus in which software that operates as a client of the external computer CTI server 400 is installed. A user can input various commands to the client computer 420.

In the present example embodiment, the service function control module 160 can receive an instruction from the client computer 420 through the external computer communication module 190 and the external computer CTI server 400. In the present example embodiment, the user can control, for example, the external telephone set 300 from the client computer 420. In other words, the exchange 100 may provide a computer telephony service to the external telephone set 300.

For example, the user can operate the client computer 420 and give a call origination instruction from the external telephone set 300 to the analog telephone set 330 to the exchange 100 via the external computer CTI server 400. The external computer communication module 190 receives (a message of) the call origination instruction from the external computer CTI server 400. The external computer communication module 190 decrypts the received message and requests the service function control module 160 to originate a call to the SIP UAC 104, which operates as a bridge extension. A call origination event with respect to the SIP UAC 104 is converted into a call origination event with respect to the external telephone set 300 by the SIP gateway module 103 and the flow control unit 105, and the external telephone set 300 is called. When the external telephone set 300 responds, the service function control module 160 shifts a state of the call to a state in which the SIP UAC 104 calls the analog telephone set 330, and causes the analog telephone set 330 to ring. When the analog telephone set 330 responds, a call between the external telephone set 300 and the analog telephone set 330 is established.

The call distribution control computer 430 is a computer apparatus used to distribute a call received by the exchange 100 to any of a plurality of extension telephones used as attendant switchboards. The call distribution control computer 430 communicates with the external computer communication module 190 by using a predetermined protocol. The call distribution control computer 430 includes an attendant switchboard extension database and a call distribution rule database. The attendant switchboard extension database stores a group of extension telephones receiving an incoming call of a predetermined dial-in number for the dial-in number. The call distribution rule database stores a rule for determining any extension telephone in a group to which a call is to be distributed. The call distribution control computer 430 refers to the attendant switchboard extension database and the call distribution rule database to determine an extension telephone as a distribution destination of the call received by the exchange 100. This function is referred to as an automatic call distributor (ACD).

For example, when a subscriber of a general telephone network originates a call to a dial-in number that the exchange 100 uses for distribution, the service function control module 160 notifies the call distribution control computer 430 of an event indicating call reception through the external computer communication module 190. The call distribution control computer 430 decrypts a message of the call reception event, and refers to the attendant switchboard extension database to identify a group of extension telephones as a distribution destination. In addition, the call distribution control computer 430 refers to the call distribution rule database and determines any extension telephone in the group to which a call is to be distributed.

The call distribution control computer 430 instructs, through the external computer communication module 190, the service function control module 160 to cause the determined extension telephone as the distribution destination to receive the call. Here, it is assumed that the call distribution control computer 430 determines that the external telephone set 300 (bridge extension telephone) is the extension telephone as the distribution destination. In that case, the service function control module 160 sends the call from the general telephone network to the SIP UAC 104 operating as a bridge extension through the multi-line control module 150 and the SIP extension control module 101. A call origination event with respect to the SIP UAC 104 is converted into a call origination event with respect to the external telephone set 300 by the SIP gateway module 103 and the flow control unit 105. The SIP gateway 106 receives the call origination event from the flow control unit 105 and transmits a call origination message to the telephone exchange server 210. The telephone exchange server 210 calls the external telephone set 300 which is a subscriber (client). When the external telephone set 300 responds, the service function control module 160 establishes a call between the subscriber of the general telephone network and the external telephone set 300.

The statistical information management server 440 is a server used to manage extension usage status in the exchange 100. For example, when the call distribution control computer 430 has distributed a call to a bridge extension, the call is received by the external telephone set 300 used as an attendant switchboard. When the external telephone set 300 responds, the service function control module 160 transmits a call reception event message to the statistical information management server 440 through the external computer communication module 190. The statistical information management server 440 generates statistical information for each extension telephone based on the call reception event message. The statistical information includes, for example, information such as the number of calls distributed as described above, an average call time, and an average time to a response. A person operating the exchange 100 can know the number of incoming calls, the number of responses, the average call time, and the like of the external telephone set 300 used as the attendant switchboard by referring to the statistical information of the external telephone set 300 in the statistical information management server 440.

In the present example embodiment, the exchange **100*b* may include the external computer communication module 190 in addition to the configurations of the exchange 100*a* described in the second example embodiment. In this case, the user can manage and control the station-line telephone set 310 with a bridge extension number by using the client computer 420**.

Note that an example in which the SIP is used as a communication protocol between the SIP extension control module 101 and the SIP gateway module 103 has been described in each of the above-described example embodiments. However, the present disclosure is not limited thereto. The communication protocol between the SIP extension control module 101 and the SIP gateway module 103 is not limited to the SIP, and protocols other than the SIP may be used. In addition, an example in which the general telephone network 250 is the ISDN has been described in each of the above-described example embodiments. However, the present disclosure is not limited thereto. A public telephone network used for the general telephone network 250 is not particularly limited to a specific telephone network.

In each of the above-described example embodiments, various processes performed in the exchange may be realized using a semiconductor apparatus such as an application specific integrated circuit (ASIC) or a programmable device such as a field-programmable gate array (FPGA). In addition, these processes may be realized by causing a computer including at least one processor (e.g. a micro processing unit (MPU) or a central processing unit (CPU)) to execute a program. Specifically, the various processes may be realized by creating one or a plurality of programs including a command group for causing a computer system to perform algorithms described using the flowcharts, the sequence diagrams, and the like in the present specification and supplying the programs to the computer system.

Figure 11:
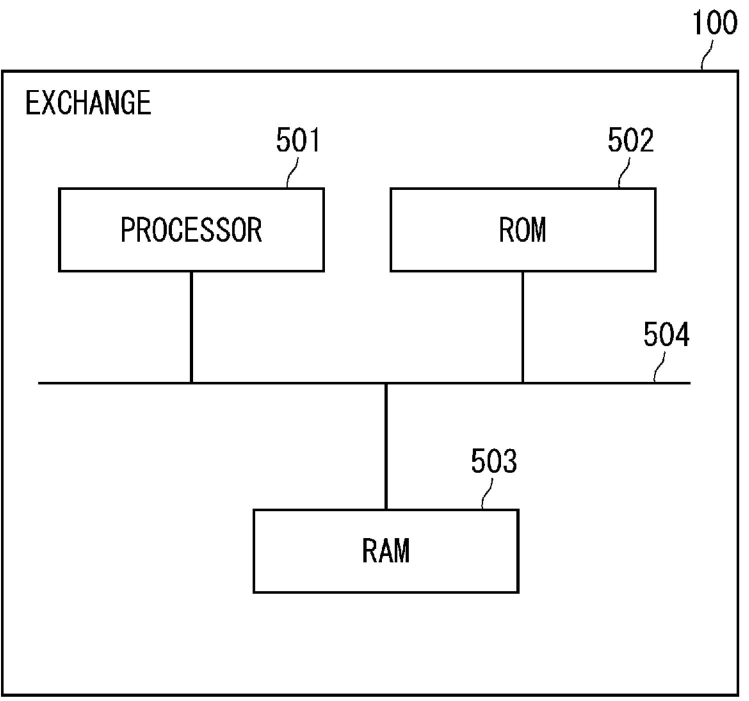
FIG. 11 is a block diagram illustrating an example of a hardware configuration of the exchange.

FIG. 11 illustrates an example of a hardware configuration of the exchange 100. The exchange 100 is configured as a computer apparatus, and includes a processor (CPU) 501, a read only memory (ROM) 502, and a random access memory (RAM) 503. In the exchange 100, the processor 501, the ROM 502, and the RAM 503 are connected to one another via a bus 504. The exchange 100 may include another circuit such as a peripheral circuit, a communication circuit, and an interface circuit, although illustration thereof is omitted.

The ROM 502 is a non-volatile storage apparatus. For example, a semiconductor storage apparatus such as a flash memory having a relatively small capacity is used for the ROM 502. The ROM 502 stores a program executed by the processor 501.

The program described above includes a group of commands (or software code) for causing a computer to perform one or more functions described in the example embodiments when being read by the computer. The program may be stored in a non-transitory computer-readable medium or a tangible storage medium. As an example and not by way of limitation, a computer-readable medium or tangible storage medium includes a RAM, a ROM, a flash memory, a solid-state drive (SSD) or other memory technology, a compact disc (CD), a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer-readable medium or a communications medium. By way of example, and not limitation, transitory computer-readable or communication media include electrical, optical, acoustic, or other forms of propagated signals.

The RAM 503 is a volatile storage apparatus. As the RAM 503, various types of semiconductor memory devices such as a dynamic random access memory (DRAM) or a static random access memory (SRAM) can be used. The RAM 503 can be used as an internal buffer for temporarily storing data and the like.

The processor 501 loads the program stored in the ROM 502 in the RAM 503, and executes the program. The function of each unit in the exchange 100 can be realized by the CPU 501 executing the program.

Although the present disclosure has been described above with reference to the example embodiments, the present disclosure is not limited to the above. Various modifications that could be understood by those skilled in the art can be made to the configurations and details of the present disclosure within the scope of the invention.

For example, part or the entirety of the example embodiment disclosed above can be described as described in the following supplementary notes, but is not limited to the following.

[Supplementary Note 1]

An exchange including:

an extension control means for controlling a call of a terminal apparatus connected to an external exchange;

a first gateway configured to transmit an outgoing call originated from the terminal apparatus to the extension control means and receive an outgoing call addressed to the terminal apparatus from the extension control means;

a second gateway configured to receive the outgoing call originated from the terminal apparatus from the terminal apparatus via the external exchange, and transmit the outgoing call addressed to the terminal apparatus to the terminal apparatus via the external exchange, the second gateway being connected to the external exchange via a network; and a flow control means for routing the outgoing call originated from the terminal apparatus and the outgoing call addressed to the terminal apparatus between the first gateway and the second gateway, in which the first gateway registers an extension number of the terminal apparatus in the extension control means, and the extension control means processes, when receiving the outgoing call originated from the terminal apparatus from the first gateway, the outgoing call as an outgoing call from the extension number of the terminal apparatus, and transmits, when an outgoing call addressed to the extension number of the terminal apparatus is made, the outgoing call addressed to the terminal apparatus to the first gateway.

[Supplementary Note 2]

The exchange according to Supplementary Note 1, in which the extension control means and the first gateway communicate with each other according to a session initiation protocol (SIP).

[Supplementary Note 3]

The exchange according to Supplementary Note 2, in which the extension control means includes a user agent server (UAS), and the first gateway includes a user agent client (UAC), and the UAC of the first gateway registers the extension number in the UAS of the extension control means.

[Supplementary Note 4]

The exchange according to any one of Supplementary Notes 1 to 3, in which the terminal apparatus transmits a message indicating an outgoing call from the terminal apparatus, the outgoing call including the extension number as a caller number, to the second gateway as the outgoing call originated from the terminal apparatus.

[Supplementary Note 5]

The exchange according to Supplementary Note 4, in which when receiving the message indicating the outgoing call from the terminal apparatus, the second gateway notifies the flow control means of an outgoing call event including the extension number as the caller number, the flow control means notifies the first gateway of the outgoing call event including the extension number as the caller number when the outgoing call event including the extension number as the caller number is notified from the second gateway, and when being notified of the outgoing call event including the extension number as the caller number from the flow control means, the first gateway transmits the message indicating the outgoing call from the terminal apparatus, the outgoing call including the extension number as the caller number, to the extension control means as the outgoing call originated from the terminal apparatus.

[Supplementary Note 6]

The exchange according to Supplementary Note 5, in which the flow control means assigns a predetermined trunk access code to the outgoing call event to perform the routing of the outgoing call event to the first gateway.

[Supplementary Note 7]

The exchange according to any one of Supplementary Notes 1 to 6, in which the extension control means transmits a message indicating an outgoing call with respect to the terminal apparatus, the outgoing call including the extension number as a destination number, to the first gateway as the outgoing call addressed to the terminal apparatus.

[Supplementary Note 8]

The exchange according to Supplementary Note 7, in which when receiving the message indicating the outgoing call with respect to the terminal apparatus, the first gateway notifies the flow control means of an outgoing call event including the extension number as the destination number, the flow control means notifies the second gateway of the outgoing call event including the extension number as the destination number when the outgoing call event including the extension number as the destination number is notified from the first gateway, and when being notified of the outgoing call event from the flow control means, the second gateway transmits the message indicating the outgoing call with respect to the terminal apparatus, the outgoing call including the extension number as the destination number, to the terminal apparatus via the external exchange as the outgoing call addressed to the terminal apparatus.

[Supplementary Note 9]

The exchange according to Supplementary Note 8, in which the flow control means assigns a predetermined trunk access code to the outgoing call event to perform the routing of the outgoing call event to the second gateway.

[Supplementary Note 10]

The exchange according to any one of Supplementary Notes 1 to 9, in which the second gateway is connected to the external exchange via a dedicated line.

[Supplementary Note 11]

The exchange according to any one of Supplementary Notes 1 to 9, in which the external exchange includes a telephone exchange provided in a public network, and a station line number used in the public network is set to the terminal apparatus, and the terminal apparatus transmits a message indicating an outgoing call from the terminal apparatus, the outgoing call including the station line number as a caller number, to the second gateway via the telephone exchange as the outgoing call originated from the terminal apparatus.

[Supplementary Note 12]

The exchange according to Supplementary Note 11, in which when receiving the message indicating the outgoing call from the terminal apparatus, the second gateway notifies the flow control means of an outgoing call event including the station line number as the caller number, when being notified of the outgoing call event including the station line number as the caller number from the second gateway, the flow control means refers to an extension database that stores a correspondence relationship between the station line number and the extension number to identify the extension number corresponding to the station line number included in the outgoing call event, and notifies the first gateway of the outgoing call event including the identified extension number as the caller number, and when being notified of the outgoing call event including the extension number as the caller number from the flow control means, the first gateway transmits the message indicating the outgoing call from the terminal apparatus, the outgoing call including the extension number as the caller number, to the extension control means as the outgoing call originated from the terminal apparatus.

[Supplementary Note 13]

The exchange according to Supplementary Note 12, in which, when the extension number corresponding to the station line number exists in the extension database, the flow control means assigns a predetermined trunk access code to the outgoing call event, and performs the routing of the outgoing call event to the first gateway.

[Supplementary Note 14]

The exchange according to any one of Supplementary Notes 11 to 13, in which the extension control means transmits a message indicating an outgoing call with respect to the terminal apparatus, the outgoing call including the extension number as a destination number, to the first gateway as the outgoing call addressed to the terminal apparatus, when receiving the message indicating the outgoing call with respect to the terminal apparatus, the first gateway notifies the flow control means of an outgoing call event including the extension number as the destination number, the flow control means refers to an extension database that stores a correspondence relationship between the station line number and the extension number to identify the station line number corresponding to the extension number included in the outgoing call event, and notifies the second gateway of the outgoing call event including the identified station line number as the destination number, and when being notified of the outgoing call event from the flow control means, the second gateway transmits the message indicating the outgoing call with respect to the terminal apparatus, the outgoing call including the station line number as the destination number, to the terminal apparatus via the telephone exchange as the outgoing call addressed to the terminal apparatus.

[Supplementary Note 15]

The exchange according to Supplementary Note 14, in which the flow control means assigns a predetermined trunk access code to the outgoing call event to perform the routing of the outgoing call event to the second gateway.

[Supplementary Note 16]

The exchange according to any one of Supplementary Notes 1 to 15, further including:

a digital subscriber circuit to which a digital extension telephone terminal including a line button corresponding to the terminal apparatus is connected; and a multi-line control means for lighting a line button corresponding to the extension number in the digital extension telephone terminal when a line of the extension number of the terminal apparatus is in use.

[Supplementary Note 17]

The exchange according to Supplementary Note 16, in which the multi-line control means lights the line button corresponding to the extension number of the terminal apparatus of the digital extension telephone terminal in a case where the terminal apparatus originates a call to an extension accommodated in the exchange, in a case where the terminal apparatus originates a call to a station line via the exchange, or in a case where the terminal apparatus receives a call from the extension or the station line.

[Supplementary Note 18]

The exchange according to Supplementary Note 16 or 17, in which the multi-line control means notifies the extension control means when the line button corresponding to the extension number is pressed, and the extension control means causes the digital extension telephone terminal to join a call between the terminal apparatus and a call party of the terminal apparatus.

[Supplementary Note 19]

The exchange according to any one of Supplementary Notes 1 to 18, further including an external computer control means to which an external computer is connected, in which the exchange and the terminal apparatus are controlled by the external computer.

[Supplementary Note 20]

The exchange according to any one of Supplementary Notes 1 to 19, further including an analog subscriber circuit to which an analog extension telephone terminal is connected.

[Supplementary Note 21]

A telephone exchange method including:

registering, by a first gateway connected to an extension control module that controls a call of a terminal apparatus connected to an external exchange, an extension number of the terminal apparatus in the extension control module;

receiving, by a second gateway connected to the external exchange via a network, an outgoing call originated from the terminal apparatus via the external exchange;

routing the outgoing call originated from the terminal apparatus from the second gateway to the first gateway;

transmitting the outgoing call originated from the terminal apparatus from the first gateway to the extension control module; and processing, by the extension control module, the outgoing call as an outgoing call originated from the extension number of the terminal apparatus when the outgoing call originated from the terminal apparatus is received.

[Supplementary Note 22]

A telephone exchange method including:

registering, by a first gateway connected to an extension control module that controls a call of a terminal apparatus connected to an external exchange, an extension number of the terminal apparatus in the extension control module;

transmitting, by the extension control module, an outgoing call addressed to the terminal apparatus to the first gateway when the outgoing call addressed to the extension number of the terminal apparatus is made;

receiving, by the first gateway, the outgoing call addressed to the terminal apparatus from the extension control module;

routing the outgoing call addressed to the terminal apparatus from the first gateway to a second gateway connected to the external exchange via a network; and transmitting, by the second gateway, the outgoing call addressed to the terminal apparatus to the terminal apparatus via the external exchange.

[Supplementary Note 23]

A program configured to cause a computer to execute processing including:

registering, by a first gateway connected to an extension control module that controls a call of a terminal apparatus connected to an external exchange, an extension number of the terminal apparatus in the extension control module;

receiving, by a second gateway connected to the external exchange via a network, an outgoing call originated from the terminal apparatus via the external exchange;

routing the outgoing call originated from the terminal apparatus from the second gateway to the first gateway;

transmitting the outgoing call originated from the terminal apparatus from the first gateway to the extension control module; and processing, by the extension control module, the outgoing call as an outgoing call originated from the extension number of the terminal apparatus when the outgoing call originated from the terminal apparatus is received.

[Supplementary Note 24]

A program configured to cause a computer to execute processing including:

registering, by a first gateway connected to an extension control module that controls a call of a terminal apparatus connected to an external exchange, an extension number of the terminal apparatus in the extension control module;

transmitting, by the extension control module, an outgoing call addressed to the terminal apparatus to the first gateway when the outgoing call addressed to the extension number of the terminal apparatus is made;

receiving, by the first gateway, the outgoing call addressed to the terminal apparatus from the extension control module;

routing the outgoing call addressed to the terminal apparatus from the first gateway to a second gateway connected to the external exchange via a network; and transmitting, by the second gateway, the outgoing call addressed to the terminal apparatus to the terminal apparatus via the external exchange.

This application claims priority based on Japanese Patent Application No. 2021-113589 filed on Jul. 8, 2021, and the entire disclosure thereof is incorporated herein.

REFERENCE SIGNS LIST

10 EXCHANGE
11 EXTENSION CONTROL MEANS
12 FIRST GATEWAY
13 FLOW CONTROL MEANS
14 SECOND GATEWAY
20 EXTERNAL EXCHANGE
30 TERMINAL APPARATUS
100 EXCHANGE
101 EXTENSION CONTROL MODULE
102 SIP UAS
103 SIP GATEWAY MODULE
104 SIP UAC
105 FLOW CONTROL UNIT
106 SIP GATEWAY
107 SIP UAC
108 SIP UAC
109 EXTENSION DB
130 ANALOG SUBSCRIBER CIRCUIT
140 DIGITAL SUBSCRIBER CIRCUIT
150 MULTI-LINE CONTROL MODULE
160 SERVICE FUNCTION CONTROL MODULE
170 TRUNK CONTROL MODULE
180 ISDN GATEWAY
190 EXTERNAL COMPUTER COMMUNICATION MODULE

200 INTERNET
210 TELEPHONE EXCHANGE SERVER
220 SIP UAS
250 GENERAL TELEPHONE NETWORK
260 STATION TELEPHONE EXCHANGE
300 EXTERNAL TELEPHONE SET
310 STATION-LINE TELEPHONE SET
330 ANALOG TELEPHONE SET
340 DIGITAL TELEPHONE SET
350 SIP TELEPHONE SET
400 EXTERNAL COMPUTER CTI SERVER
410 NETWORK
420 CLIENT COMPUTER
430 CALL DISTRIBUTION CONTROL COMPUTER
440 STATISTICAL INFORMATION MANAGEMENT SERVER

The invention claimed is:

1. An exchange comprising:

an extension controller configured to control a call of a terminal apparatus connected to an external exchange;

a first gateway configured to transmit an outgoing call originated from the terminal apparatus to the extension controller and receive an outgoing call addressed to the terminal apparatus from the extension controller;

a second gateway configured to receive the outgoing call originated from the terminal apparatus from the terminal apparatus via the external exchange, and transmit the outgoing call addressed to the terminal apparatus to the terminal apparatus via the external exchange, the second gateway being connected to the external exchange via a network; and a flow controller configured to route the outgoing call originated from the terminal apparatus and the outgoing call addressed to the terminal apparatus between the first gateway and the second gateway, wherein the first gateway registers an extension number of the terminal apparatus in the extension controller, and the extension controller processes, when receiving the outgoing call originated from the terminal apparatus from the first gateway, the outgoing call as an outgoing call from the extension number of the terminal apparatus, and transmits, when an outgoing call addressed to the extension number of the terminal apparatus is made, the outgoing call addressed to the terminal apparatus to the first gateway.

2. The exchange according to claim 1, wherein the extension controller and the first gateway communicate with each other according to a session initiation protocol (SIP).

3. The exchange according to claim 2, wherein the extension controller includes a user agent server (UAS), and the first gateway includes a user agent client (UAC), and the UAC of the first gateway registers the extension number in the UAS of the extension controller.

4. The exchange according to claim 1, wherein the terminal apparatus transmits a message indicating an outgoing call from the terminal apparatus, the outgoing call including the extension number as a caller number, to the second gateway as the outgoing call originated from the terminal apparatus.

5. The exchange according to claim 4, wherein when receiving the message indicating the outgoing call from the terminal apparatus, the second gateway notifies the flow controller of an outgoing call event including the extension number as the caller number, the flow controller notifies the first gateway of the outgoing call event including the extension number as the caller number when the outgoing call event including the extension number as the caller number is notified from the second gateway, and when being notified of the outgoing call event including the extension number as the caller number from the flow controller, the first gateway transmits the message indicating the outgoing call from the terminal apparatus, the outgoing call including the extension number as the caller number, to the extension controller as the outgoing call originated from the terminal apparatus.

6. The exchange according to claim 5, wherein the flow controller assigns a predetermined trunk access code to the outgoing call event to perform the routing of the outgoing call event to the first gateway.

7. The exchange according to claim 1, wherein the extension controller transmits a message indicating an outgoing call with respect to the terminal apparatus, the outgoing call including the extension number as a destination number, to the first gateway as the outgoing call addressed to the terminal apparatus.

8. The exchange according to claim 7, wherein when receiving the message indicating the outgoing call with respect to the terminal apparatus, the first gateway notifies the flow controller of an outgoing call event including the extension number as the destination number, the flow controller notifies the second gateway of the outgoing call event including the extension number as the destination number when the outgoing call event including the extension number as the destination number is notified from the first gateway, and when being notified of the outgoing call event from the flow controller, the second gateway transmits the message indicating the outgoing call with respect to the terminal apparatus, the outgoing call including the extension number as the destination number, to the terminal apparatus via the external exchange as the outgoing call addressed to the terminal apparatus.

9. The exchange according to claim 8, wherein the flow controller assigns a predetermined trunk access code to the outgoing call event to perform the routing of the outgoing call event to the second gateway.

10. The exchange according to claim 1, wherein the second gateway is connected to the external exchange via a dedicated line.

11. The exchange according to claim 1, wherein the external exchange includes a telephone exchange provided in a public network, and a station line number used in the public network is set to the terminal apparatus, and the terminal apparatus transmits a message indicating an outgoing call from the terminal apparatus, the outgoing call including the station line number as a caller number, to the second gateway via the telephone exchange as the outgoing call originated from the terminal apparatus.

12. The exchange according to claim 11, wherein when receiving the message indicating the outgoing call from the terminal apparatus, the second gateway notifies the flow controller of an outgoing call event including the station line number as the caller number, when being notified of the outgoing call event including the station line number as the caller number from the second gateway, the flow controller refers to an extension database that stores a correspondence relationship between the station line number and the extension number to identify the extension number corresponding to the station line number included in the outgoing call event, and notifies the first gateway of the outgoing call event including the identified extension number as the caller number, and when being notified of the outgoing call event including the extension number as the caller number from the flow controller, the first gateway transmits the message indicating the outgoing call from the terminal apparatus, the outgoing call including the extension number as the caller number, to the extension controller as the outgoing call originated from the terminal apparatus.

13. The exchange according to claim 12, wherein when the extension number corresponding to the station line number exists in the extension database, the flow controller assigns a predetermined trunk access code to the outgoing call event, and performs the routing of the outgoing call event to the first gateway.

14. The exchange according to claim 11, wherein the extension controller transmits a message indicating an outgoing call with respect to the terminal apparatus, the outgoing call including the extension number as a destination number, to the first gateway as the outgoing call addressed to the terminal apparatus, when receiving the message indicating the outgoing call with respect to the terminal apparatus, the first gateway notifies the flow controller of an outgoing call event including the extension number as the destination number, the flow controller refers to an extension database that stores a correspondence relationship between the station line number and the extension number to identify the station line number corresponding to the extension number included in the outgoing call event, and notifies the second gateway of the outgoing call event including the identified station line number as the destination number, and when being notified of the outgoing call event from the flow controller, the second gateway transmits the message indicating the outgoing call with respect to the terminal apparatus, the outgoing call including the station line number as the destination number, to the terminal apparatus via the telephone exchange as the outgoing call addressed to the terminal apparatus.

15. The exchange according to claim 14, wherein the flow controller assigns a predetermined trunk access code to the outgoing call event to perform the routing of the outgoing call event to the second gateway.

16. The exchange according to claim 1, further comprising:

a digital subscriber circuit to which a digital extension telephone terminal including a line button corresponding to the terminal apparatus is connected; and a multi-line controller configured to light a line button corresponding to the extension number in the digital extension telephone terminal when a line of the extension number of the terminal apparatus is in use.

17. The exchange according to claim 16, wherein the multi-line controller lights the line button corresponding to the extension number of the terminal apparatus of the digital extension telephone terminal in a case where the terminal apparatus originates a call to an extension accommodated in the exchange, in a case where the terminal apparatus originates a call to a station line via the exchange, or in a case where the terminal apparatus receives a call from the extension or the station line.

18. The exchange according to claim 16, wherein the multi-line controller notifies the extension controller when the line button corresponding to the extension number is pressed, and the extension controller causes the digital extension telephone terminal to join a call between the terminal apparatus and a call party of the terminal apparatus.

19. The exchange according to claim 1, further comprising an external computer controller to which an external computer is connected, wherein the exchange and the terminal apparatus are controlled by the external computer.

20. The exchange according to claim 1, further comprising an analog subscriber circuit to which an analog extension telephone terminal is connected.

21. A telephone exchange method comprising:

registering, by a first gateway connected to an extension controller that controls a call of a terminal apparatus connected to an external exchange, an extension number of the terminal apparatus in the extension controller;

receiving, by a second gateway connected to the external exchange via a network, an outgoing call originated from the terminal apparatus via the external exchange;

routing the outgoing call originated from the terminal apparatus from the second gateway to the first gateway;

transmitting the outgoing call originated from the terminal apparatus from the first gateway to the extension controller; and processing, by the extension controller, the outgoing call as an outgoing call originated from the extension number of the terminal apparatus when the outgoing call originated from the terminal apparatus is received.

22. A telephone exchange method comprising:

registering, by a first gateway connected to an extension controller that controls a call of a terminal apparatus connected to an external exchange, an extension number of the terminal apparatus in the extension controller;

transmitting, by the extension controller, an outgoing call addressed to the terminal apparatus to the first gateway when the outgoing call addressed to the extension number of the terminal apparatus is made;

receiving, by the first gateway, the outgoing call addressed to the terminal apparatus from the extension controller;

routing the outgoing call addressed to the terminal apparatus from the first gateway to a second gateway connected to the external exchange via a network; and transmitting, by the second gateway, the outgoing call addressed to the terminal apparatus to the terminal apparatus via the external exchange.

* * * * *